(12) United States Patent
Bammert et al.

(10) Patent No.: US 8,392,937 B2
(45) Date of Patent: Mar. 5, 2013

(54) SUSPENSION ARM ACTUATOR FOR A SCANNING DEVICE INCLUDING A MAGNET FOR FIELD OPTIMIZATION

(75) Inventors: Michael Bammert, Hardt (DE); Tsuneo Suzuki, Moenchweiler (DE); Rolf Dupper, Villingen-Schwenningen (DE)

(73) Assignee: Thomson Licensing, Issy-les-Moulineaux (FR)

( * ) Notice: Subject to any disclaimer, the term of this patent is extended or adjusted under 35 U.S.C. 154(b) by 1245 days.

(21) Appl. No.: 12/221,895

(22) Filed: Aug. 7, 2008

(65) Prior Publication Data
US 2009/0070795 A1 Mar. 12, 2009

(30) Foreign Application Priority Data
Sep. 6, 2007 (DE) .......... 10 2007 042 291

(51) Int. Cl.
G11B 7/095 (2006.01)
G11B 21/08 (2006.01)
(52) U.S. Cl. .................. 720/662; 360/264.8
(58) Field of Classification Search ........ 360/265.5, 360/265.6, 294.7, 264–265; 720/662, 666
See application file for complete search history.

(56) References Cited

U.S. PATENT DOCUMENTS

| 4,408,311 | A | 10/1983 | Suzuki et al. |
| 5,870,253 | A * | 2/1999 | Ogawa et al. ........... 360/245.9 |
| 7,131,128 | B2 | 10/2006 | Kim et al. |
| 2004/0148619 | A1 | 7/2004 | Kim et al. |
| 2006/0123437 | A1 | 6/2006 | Lee et al. |

FOREIGN PATENT DOCUMENTS

| DE | 0400570 | A2 | 8/1924 |
| DE | 3119493 | A1 | 5/1982 |
| EP | 0829864 | A2 | 3/1998 |
| EP | 1316956 | A2 | 6/2003 |
| JP | 2004227760 | A | 8/2004 |
| KR | 1020040108029 | A | 12/2004 |

OTHER PUBLICATIONS

Search report dated Dec. 5, 2007.

* cited by examiner

*Primary Examiner* — Craig A. Renner
*Assistant Examiner* — Gustavo Polo
(74) *Attorney, Agent, or Firm* — Myers Wolin, LLC

(57) ABSTRACT

A suspension arm actuator for a scanning device includes a suspension arm which is designed as a two-arm lever having a first and second arms. The second lever arm includes a component for a magnetic drive for a swivel motion of the suspension arm. The component is arranged at a recess having the shape of a circular arc, with an inner leg of a yoke being permanently attached to a support projecting into the recess and forming a magnetic yoke, wherein the yoke is provided with a shell-like magnet on its outer leg in order to form the magnetic drive. A magnet for field optimization, which is magnetized perpendicularly in relation to the shell-like magnet, is arranged on the yoke in the region between the inner leg and the shell-like magnet to increase the sensitivity of the suspension arm actuator.

11 Claims, 2 Drawing Sheets

SUSPENSION ARM ACTUATOR FOR A SCANNING DEVICE INCLUDING A MAGNET FOR FIELD OPTIMIZATION

This application claims the benefit, under 35 U.S.C. §119, of European Patent Application No. 102007042291.3 of 6 Sep. 2007.

FIELD OF THE INVENTION

The invention relates to a suspension arm actuator for a scanning device with a pickup, in particular with an optical head having a focal lens, to be arranged in a device for recording and/or reproducing information.

BACKGROUND

A suspension arm arranged in such a scanning device is usually designed in the form of a two-arm lever and is, in its center of gravity between the two lever arms, provided with a bearing that is arranged on a support in order to allow the suspension arm to make a movement about at least one axis. A pickup, for example an optical head having a focal lens and intended for emission of a light beam, in particular a laser beam, onto an optical disk (disk-shaped data carrier) designed as an information carrier and for reception of the beam reflected by said optical disk is arranged at one end of said suspension arm. Therein, the disk is supported by a supporting device and is caused to make a rotational motion. The end of the suspension arm, which is provided with the optical head, is movable in the form of an arc in a plane extending in parallel to the recording surface of the optical disk for tracking and perpendicularly to this plane for focusing. To achieve this, the suspension arm is provided with magnetic drives, wherein at least that one of said magnetic drives that is intended for the tracking motion is allocated to the other end of the suspension arm. Such a suspension arm allows to achieve short times of access to various locations on the recording carrier.

Such suspension arm actuators are, for example, described in EP-A-0 400 570, in JP-A-5128580, in JP-A-2004227760, in US 2004/0148619 A1, and in KR 1020040108029 A.

The suspension arm actuator described in US 2004/0148619 is arranged on a support such that it can be pivoted about an axis and, to achieve said pivoting, comprises a magnetic drive at that end region that is arranged opposite to the optical head having a focal lens, said magnetic drive being formed of a magnetic arrangement permanently arranged on the support and of a coil arranged on the suspension arm, with control of the operating current of said coil. On the pivot axis side facing away from the magnetic drive, that is on the side of the focal lens, the suspension arm comprises an elastic region, which supports the optical head at its free end. A second magnetic drive formed with the suspension arm is allocated to said elastic region on the head side thereof, said elastic region being partially enclosed by the remaining suspension arm and said second magnetic drive being able to move said free end and, thus, the head in focusing direction.

BRIEF SUMMARY OF THE INVENTION

The suspension arm actuator for a scanning device according to the present invention comprises a suspension arm designed as a two-arm lever and mounted to a support between the lever arms such that it can be pivoted about a pivot axis extending perpendicularly in relation to the suspension arm, wherein one lever arm is provided with a recess to allow a swivel motion of the suspension arm. The inner leg of a yoke having a U-shaped cross-section is permanently attached to the support and projects into the recess. A shell-like magnet is arranged on the outer leg of the yoke, which magnet forms a first magnetic drive together with at least one coil surrounding the recess, wherein a second magnet for field optimization is arranged on the yoke in the region between the inner leg thereof and the shell-like magnet and underneath the second printed coil.

In a preferred embodiment, the invention consists of a suspension arm actuator for a scanning device, said suspension arm actuator being allocated to a disk-shaped data carrier and held against a support in known manner while being designed in the form of a two-arm lever, wherein said holding mechanism simultaneously forms a bearing with a pivot axis for swiveling the suspension arm in parallel to the surface of the optical disk. Therein, one of the lever arms of the suspension arm supports a pickup, for example an optical head having a focal lens, at its end side while the other lever arm comprises a printed focus coil as a component of a magnetic drive initiating a swivel motion of the lever arm supporting the pickup in a direction perpendicular in relation to the surface of the data carrier for focusing. This focus coil is printed on the upper and lower sides around a recess formed on the lever arm and having the shape of a circular arc, wherein the inner leg of a yoke with a U-shaped cross-section engages said recess and a shell-like magnet which is operably connected to the focus coil and forms a magnetic drive is arranged on the outer leg of said yoke. In addition, the suspension arm is provided with a component of a magnetic drive initiating a swivel motion about the pivot axis and in parallel to the data carrier. According to the invention, a magnet for field optimization which is magnetized perpendicularly in relation to the shell-like magnet is arranged on the yoke in the region between the inner leg thereof and the shell-like magnet and underneath the focus coil.

Owing to the arrangement of the additional magnet for field optimization, the magnetic field of the shell-like magnet is influenced such that the magnetomotive force of the focus coil is improved, accompanied by a considerable increase in focus sensitivity. Preferably, the magnet is designed in the shape of cuboid.

The magnetomotive force of the upper coil strand and, thus, the focus sensitivity of the suspension arm can be further improved by arranging a shell-like magnet on the inner leg of the U-shaped yoke as well (magnetic yoke). The magnetic field of said shell-like magnet provides a magnetomotive force through the focus coil in addition to the aforementioned magnet.

The component for initiating a swivel motion of the suspension arm about the pivot axis in parallel to the surface of the data carrier is arranged between the pivot axis and the magnetic drive initiating a focusing motion; to save space, said component is, preferably, also a printed coil. Together with a magnet which is permanently attached to the support, said printed coil forms a magnetic drive initiating the tracking motion. This results in the creation of a suspension arm actuator with a simplified structure, said suspension arm actuator and, above all, that lever arm of said suspension arm actuator that supports the pickup being reduced in weight; as a result, the inertia of the suspension arm is reduced, this involving shorter times of access to various locations on a data carrier. A further advantage is that the diversity of components is reduced, this resulting in less work, in particular in a minimization of costs.

Preferably, the suspension arm is designed such that the lever arm supporting the pickup comprises an elastically bendable region for moving the pickup in focusing direction and is non-rotatably connected to a bearing element which allows a swivel motion about the pivot axis. The second lever arm is securely connected to the first lever arm in the region between the pickup and the bendable region and is freely suspended on that side of the bendable region that is facing away from the pickup.

The suspension arm actuator of the invention provides in particular an increased sensitivity for focus adjustments.

BRIEF DESCRIPTION OF THE DRAWINGS

The invention is illustrated below by means of an exemplary embodiment. In the associated drawings.

DETAILED DESCRIPTION OF PREFERRED EMBODIMENTS

Figure 1:
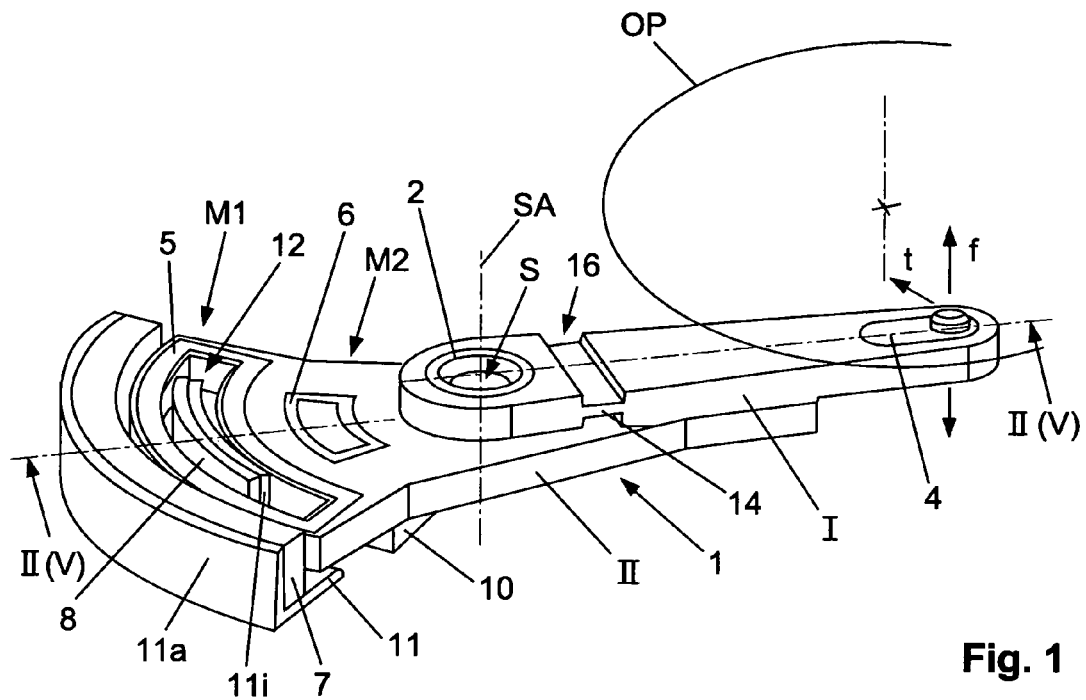
FIG. 1 is a perspective view of a suspension arm actuator.
Figure 2:
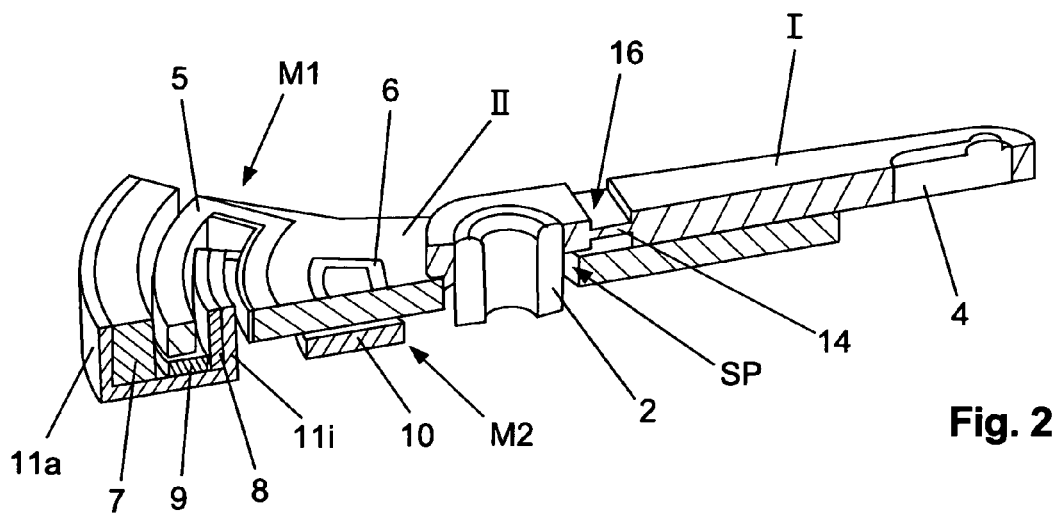
FIG. 2 shows said suspension arm actuator in a longitudinal sectional view taken from II-II, in perspective.
Figure 5:
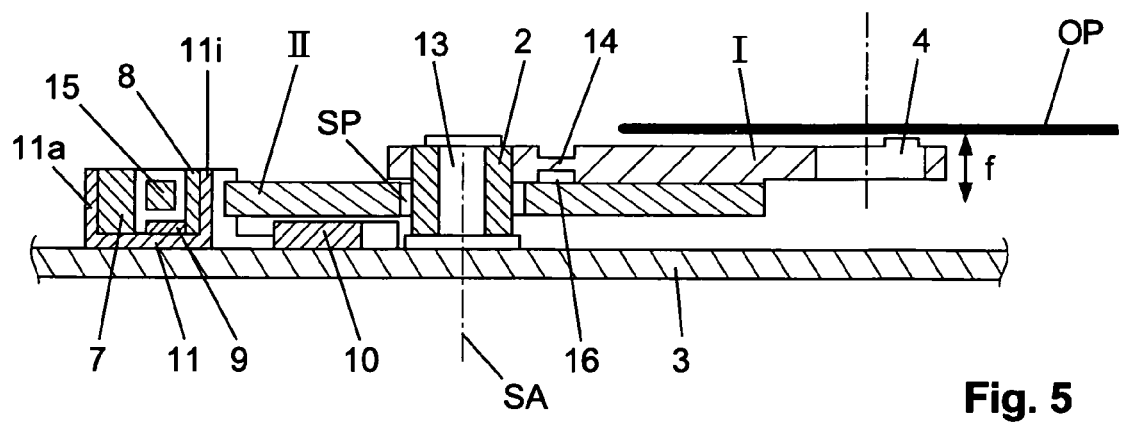
FIG. 5 shows the suspension arm actuator arranged on a support in a longitudinal sectional view taken from V-V.

The suspension arm actuator shown in FIGS. 1 and 2, which is provided for an optical scanning device, not illustrated, comprises a rigid and torsionally stiff suspension arm 1 which is made of polypropylene, is designed in the form of a two-arm lever, is provided with a bearing bush 2 in its center of gravity CG between the lever arms I and II, and is, by means of said bearing bush 2, mounted to a support 3, FIG. 5, such that it can be pivoted about a pivot axis PA perpendicularly in relation to the suspension arm 1. At its free end, the lever arm I supports an optical head 4 having a focal lens. The lever arm II supports printed coils 5 and 6 in a concentric arrangement in relation to the pivot axis PA, said coils 5 and 6 each being allocated to permanent magnets 7, 8, 9 and 10, wherein said permanent magnets 7 and 8 are arranged on the legs 11a and 11i of a yoke 11 with a U-shaped cross-section that is permanently attached to the support, said yoke 11 being formed concentrically in relation to the pivot axis PA.

Therein, the shell-like magnet 7 is arranged on the inner side of the outer leg 11a and the shell-like magnet 8 on the inner side of the inner leg 11i, wherein the inner leg 11i serves as a magnetic yoke and projects into a recess 12 having the shape of a circular arc and formed on the end side of the lever arm II, said recess being surrounded by coil strands of the coil 5 on its upper and lower sides, said coil 5 constituting a focus coil. A magnet 9 for field optimization is arranged on the yoke 11, in the region between the inner leg 11i and the shell-like magnet 7 and underneath the focus coil 5. Said magnet 9 is designed in the shape of a cuboid and is magnetized perpendicularly in relation to the shell-like magnets 7 and 8.

The magnets 7, 8 and 9 and the focus coil 5 form a magnetic drive M1 initiating a pitching motion of the lever arm I with the optical head in a direction perpendicular in relation to the surface of an optical disk OD, the focusing direction f, said optical disk OD being indicated in FIG. 1, wherein the magnets 8 and 9 serve for field optimization. The magnet 10 and the coil 6, a tracking coil, allocated there to form a magnetic drive M2 initiating a swivel motion of the suspension arm 1 in a pivot plane extending in parallel to the disk OD and, at the same time, in a radial direction in relation to the disk OD, tracking direction t. For the magnets 7-10, advantageously Neodymium magnets or any other rare earth magnet may be used. For the yoke 11 for example soft iron is used.

Figure 3:
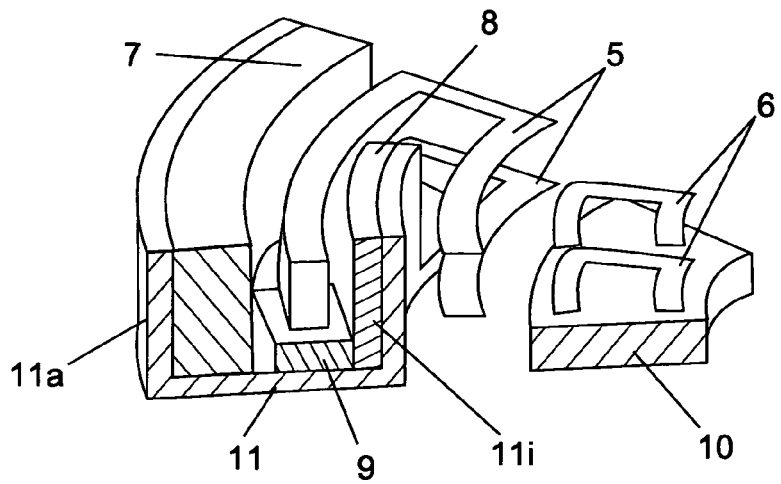
FIG. 3 is a perspective view of the magnetic drives of the suspension arm actuator.
Figure 4:
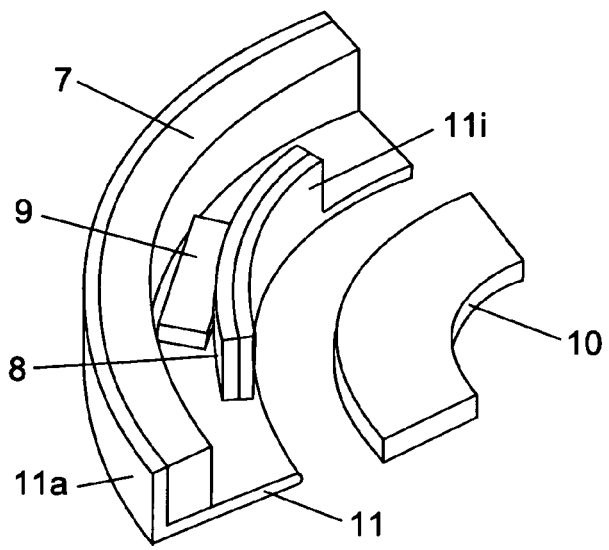
FIG. 4 is a perspective top view of the magnet arrangement of the magnetic drives.

FIGS. 2 to 4 illustrate the arrangement and formation of the magnets 7 to 10, while FIGS. 2 and 3 illustrate the arrangement of the printed coils 5 and 6. In particular, FIGS. 3 and 4 show the arrangement and formation of the field optimization magnet 9 which is allocated to the focus coil 5.

FIG. 5 shows the suspension arm actuator on the support 3 in a sectional view taken along V-V and, simultaneously, the formation of the suspension arm 1. A pivot pin 13 is permanently arranged on the support 3, with the suspension arm 1 being pivoted to said pivot pin 13 by means of the bearing bush 2 which is arranged on the lever arm I in a non-rotatable manner. To initiate a motion of the head 4 in focusing direction f and perpendicularly to the pivot plane, the lever arm I comprises an elastically bendable region 14. The lever arm II is securely connected to said lever arm I in the region between the optical head 4 and the region 14, is held exclusively in said region and is, thus, freely suspended up to its edge region 15 on that side of the bendable region 14 that is facing away from the head 4. Due to a groove 16 incorporated on the lower side and the upper side of the lever arm I, the region 14 is considerably reduced as compared with the thickness of this lever arm I while being designed in its thickness such that the first magnetic drive M1 moves the head-sided part of the otherwise rigid lever arm I in focusing direction f once the lever arm II is loaded. The secure connection of the two lever arms I and II is also used to initiate the swivel motion of the lever arm I about the pivot axis PA and, thus, to initiate a swivel motion of the entire suspension arm 1, wherein said swivel motion of the lever arm I about the pivot axis PA results from a swivel motion of the lever arm II caused by the second magnetic drive M2. The arrangement of the lever arm II is characterized by a play PL in relation to the bearing bush 2, with the result that this lever arm is freely suspended.

The optical disk OD which is allocated to the suspension arm 1 and the head 4 thereof is arranged in parallel to said suspension arm 1. A swivel motion of the suspension arm 1 about the pivot axis PA causes the head 4 to be moved in radial direction relative to the disk OD, see FIG. 1, tracking direction t. Focusing of a specific point on the disk OD is achieved through a motion of the lever arm II and, thus, of the optical head 4 in focusing direction f and perpendicularly in relation to the tracking direction t, with the magnets 8 and 9 providing for a sensitivity which is increased by up to 20 percent.

Also other embodiments of the invention can be made by a person skilled in the art without departing from the spirit and scope of the invention. The invention resides therefore in the claims herein after appended.

LIST OF REFERENCE SYMBOLS

1 Suspension arm
2 Bearing bush
3 Support
4 Optical head
5 Focus coil
6 Tracking coil
7 First permanent magnet
8 Third permanent magnet
9 Second permanent magnet
10 Fourth permanent magnet
11 Yoke
11a Leg
11i Leg
12 Recess
13 Pivot pin 14 Region
15 Edge region
16 Groove
I Lever arm
II Lever arm
f Focusing direction
M1 First magnetic drive
M2 Second magnetic drive
OP Optical disk
S Center of gravity
SA Pivot axis
SP Play
t Tracking direction

The invention claimed is:

1. A suspension arm actuator for a scanning device, comprising a suspension arm which is designed as a two-arm lever having a first and a second lever arm, is allocated to a disk-shaped data carrier and is mounted to a support between the lever arms such that it can be pivoted about a pivot axis extending perpendicularly in relation to the suspension arm,
wherein the first lever arm supports a pickup and the second lever arm is provided with a recess to initiate a swivel motion of the suspension arm, and
wherein an inner leg of a yoke with a U-shaped cross-section is permanently attached to the support and projects into said recess and a first shell-like magnet is arranged on an outer leg of said yoke not projecting into said recess and a second shell-like magnet is arranged on said inner leg of said yoke projecting into said recess, said yoke and said first and second shell-like magnets forming a first magnetic drive together with at least a first printed coil of the suspension arm surrounding said recess, and wherein
a third magnet for field optimization is arranged on the yoke in the region between the inner leg thereof and the first shell-like magnet and underneath the first printed coil.

2. The suspension arm actuator according to claim 1, wherein the third magnet is magnetized perpendicularly in relation to the first and second shell-like magnets.

3. The suspension arm actuator according to claim 2, wherein the third magnet is designed in the shape of a cuboid.

4. The suspension arm actuator according to claim 2, wherein the inner leg of the yoke, which is projecting into the recess, simultaneously defines the maximum deflection of the suspension arm in parallel to the data carrier.

5. The suspension arm actuator according to claim 2, wherein the first printed coil surrounds said recess and constitutes a focus coil, and that the suspension arm is provided with a component of a second magnetic drive initiating a swivel motion about the pivot axis and in parallel to the data carrier.

6. The suspension arm actuator according to claim 5, wherein the component is arranged on the second lever arm in the region between the pivot axis and the first magnetic drive, in order to make a swivel motion about the pivot axis and in parallel to the surface of the data carrier.

7. The suspension arm actuator according to claim 5, wherein the component is at least a second printed coil, which is arranged on the second lever arm, said second printed coil forming a second magnetic drive initiating a tracking motion together with a fourth magnet being permanently attached to the support.

8. The suspension arm actuator according to claim 5, wherein the first lever arm supports the pickup and comprises an elastically bendable region for initiating the motion of the pickup in a focusing direction, the first lever arm is non-rotatably connected to a bearing element allowing a swivel motion about the pivot axis, and wherein the second lever arm is securely connected to the first lever arm in the region between the pickup and the elastically bendable region and freely suspended on that side of said region that is facing away from the pickup.

9. The suspension arm actuator according to claim 2, wherein the suspension arm is supported in its center of gravity.

10. The suspension arm actuator according to claim 2, wherein said suspension arm actuator and a scanning device formed therewith are used in a device for reading or writing to disk-shaped data carriers.

11. The suspension arm actuator according to claim 2, wherein the recess and the inner leg that projects into said recess are provided with a curvature having the shape of a circular arc, with the center of said curvature being the pivot axis.

* * * * *